(12) United States Patent
Barber et al.

(10) Patent No.: US 6,826,439 B1
(45) Date of Patent: Nov. 30, 2004

(54) BROADBAND DISTRIBUTION OF SECS-II DATA

(75) Inventors: Casey A. Barber, Kyle, TX (US); Sam H. Allen, Jr., New Braunfels, TX (US); John T. Halladay, Cedar Creek, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/576,511

(22) Filed: May 23, 2000

(51) Int. Cl.$^7$ .............................................. G06F 19/00
(52) U.S. Cl. ..................................... 700/108; 702/182
(58) Field of Search ............................... 700/121, 108; 705/11; 707/102; 702/84, 182

(56) References Cited

U.S. PATENT DOCUMENTS

| | | | |
|---|---|---|---|
| 4,633,720 A | 1/1987 | Dybel et al. ............. 73/862.53 |
| 5,177,420 A | 1/1993 | Wada et al. ........... 318/568.11 |
| 5,367,624 A | 11/1994 | Cooper ....................... 395/157 |
| 5,428,555 A | * 6/1995 | Starkey et al. ............... 700/275 |
| 5,469,361 A | * 11/1995 | Moyne ......................... 700/95 |
| 5,526,254 A | 6/1996 | Sato et al. ..................... 700/56 |
| 5,591,299 A | * 1/1997 | Seaton et al. ................ 700/121 |
| 5,768,133 A | 6/1998 | Chen et al. .................... 700/95 |
| 5,778,386 A | 7/1998 | Lin et al. .................. 707/200.1 |
| 5,818,713 A | 10/1998 | Uchihara et al. .............. 700/79 |
| 5,862,051 A | 1/1999 | Barbur ....................... 700/106 |
| 5,878,408 A | 3/1999 | Van Huben et al. ............. 707/1 |
| 5,953,439 A | 9/1999 | Ishihara et al. ............. 382/107 |
| 6,128,403 A | 10/2000 | Ozaki ......................... 382/145 |
| 6,128,629 A | 10/2000 | Bretschneider et al. ..... 707/203 |
| 6,161,137 A | 12/2000 | Ogdon et al. ................ 709/224 |
| 6,163,740 A | 12/2000 | Beltracchi .................... 700/286 |
| 6,336,053 B1 | 1/2002 | Beatty ........................ 700/108 |
| 6,342,904 B1 | 1/2002 | Vasudevan et al. ......... 345/723 |
| 6,343,238 B1 | 1/2002 | Kudo .......................... 700/108 |
| 6,345,259 B1 | 2/2002 | Sandoval ....................... 705/7 |

OTHER PUBLICATIONS

"With myFab2k: my Fab is o.k.!," http://www.myfab2k.com/mainunten.htm, Apr. 5, 2001, 1 page.
"IPC: mission," http://www.myfab2k.com/, Apr. 5, 2001, 1 page.
"IPC: products," http://www.myfab2k.com/, Apr. 5, 2001, 1 page.
"products—SCM Box," http://www.myfab2k.com/products/scm-box.htm, Apr. 5, 2001, 1 page.
"SCM—b Box: Product description," http://www.myfab2k.com/news/boxdescription.htm, Apr. 5, 2001, 3 pages.

(List continued on next page.)

*Primary Examiner*—Leo Picard
*Assistant Examiner*—Sheela Rao
(74) *Attorney, Agent, or Firm*—Hamilton & Terrile, LLP; Stephen A. Terrile

(57) ABSTRACT

The present invention relates to an equipment interface which obtains data communicated between a tool, such as a semiconductor manufacturing tool, and its host computer system in real-time via a point-to-point connection. The equipment interface distributes the data automatically and continually to other remote application programs without the need for hardware to be added to the tool or to the host computer system.

49 Claims, 7 Drawing Sheets

OTHER PUBLICATIONS

"IPC: products EASI OEE," http://www.myfab2k.com/, Apr. 5, 2001, 1 page.

"IPC: products—EASI eNotify," http://www.myfab2k.com/, Apr. 5, 2001, 1 page.

"IPC: news," http://www.myfab2k.com/, Apr. 5, 2001, 1 page.

"IPC: myfab2k newsletter," http://www.myfab2k.com/, Apr. 5, 2001, 1 page.

"IPC: news—IPC Fab automation exhibits at Semicon Europa 2001," http://www.myfab2k.com/, Apr. 5, 2001, 1 page.

"IPC: news—Open Marketplace," http://www.myfab2k.com/, Apr. 5, 2001, 1 page.

"IPC: press," http://www.myfab2k.com/, Apr. 5, 2001, 1 page.

"IPC: tour," http://www.myfab2k.com, Apr. 5, 2001, 1 page.

"IPC: contact," http://www.myfab2k.com, Apr. 5, 2001, 1 page.

* cited by examiner

BROADBAND DISTRIBUTION OF SECS-II DATA

CROSS-REFERENCE TO RELATED APPLICATIONS

This application relates to application Ser. No. 09/489,449 entitled "Manufacturing Management System Client" and naming John T. Halladay, Scott A. Collier, Casey A. Barber, Zachary T. Piech, and Michael A. Hillis as inventors, the application being incorporated herein by reference in its entirety.

This application relates to application Ser. No. 09/489,443 entitled "Slide Writer for Manufacturing Management System" and naming John T. Halladay, Scott A. Collier, and Casey A. Barber as inventors, the application being incorporated herein by reference in its entirety.

This application relates to application Ser. No. 09/489,442 entitled "Manager's Viewer for Manufacturing Management System" and naming John T. Halladay, Zachary T. Piech, and Scott A. Collier as inventors, the application being incorporated herein by reference in its entirety.

This application relates to application Ser. No. 09/489,444 entitled "Time Series Data Viewer for Manufacturing Management System" and naming John T. Halladay, Casey A. Barber, Zachary T. Piech, and Scott A. Collier as inventors, the application being incorporated herein by reference in its entirety.

This application relates to application Ser. No. 09/489,445 entitled "Manufacturing Intelligence Portal for Manufacturing Management System" and naming John T. Halladay, Casey A. Barber, Scott A. Collier, and Zachary T. Piech as inventors, the application being incorporated herein by reference in its entirety.

This application relates to application Ser. No. 09/489,448 entitled "Reporting Interface for Manufacturing Management System" and naming John T. Halladay, Zachary T. Piech, and Scott A. Collier as inventors, the application being incorporated herein by reference in its entirety.

This application relates to application Ser. No. 09/489,447 entitled "Time Series Data Grabber for Manufacturing Management System" and naming Zachary T. Piech, Scott A. Collier, and John T. Halladay as inventors, the application being incorporated herein by reference in its entirety.

BACKGROUND OF THE INVENTION

1. Field of the Invention

The present invention relates to an equipment interface for obtaining data communicated between a tool and its host computer system and distributing the data. More particularly, the invention relates to an equipment interface for obtaining a live stream of data communicated between a semiconductor manufacturing tool and its host computer system and distributing the data to remote application programs requesting the data.

2. Description of the Related Art

Technological advances have produced increasingly complex manufacturing systems, and accordingly, increasingly complex manufacturing management systems are necessary. Information must be gathered to determine output requirements, to procure raw materials, to allocate manufacturing resources, to schedule work in various manufacturing processes, to track work in progress, to troubleshoot and correct manufacturing problems, to measure actual manufacturing performance, to compare actual performance to performance goals, and to control quality of units produced. The sources of information used to make these management decisions vary widely, from product sales data to shop personnel to the actual manufacturing tools themselves. Many manufacturing facilities manage this vast information by combining computerized management systems with paper-based management systems.

A particular management challenge in the manufacturing environment is communicating time-critical performance information to management and shop personnel so that performance problems may be corrected as soon as possible. In a manufacturing environment involving many processing steps, errors detected near the time they are made may be correctable before the product moves on to other processing steps. Significant cost savings are possible if a problem in the manufacturing shop renders a product unusable and additional processing steps on the unusable product are avoided.

Most manufacturing facilities use a variety of enterprise data management systems (EDMS) that manage enterprise-wide information. EDMS may include enterprise resource planning (ERP) subsystems that monitor, schedule and validate production inputs such as materials, equipment, personnel, work instructions and facility conditions. However, EDMS typically include only enterprise-level information and do not integrate real-time status information collected from tools in the manufacturing shop that would be useful to management and shop personnel. The term real-time is used herein to describe any electronic operation fast enough to keep up with its real-world counterpart, in this case, transmitting live tool status information immediately when an event occurs.

Another limitation of EDMS is that most EDMS communicate to personnel via only a pull model, where personnel must specifically request information from a particular source. For example, to obtain work in progress (WIP) information, personnel must ordinarily request a WIP report from the EDMS. In contrast, in a system using a push model, data is automatically delivered into computer systems at prescribed intervals or based upon the occurrence of particular events. These particular events may include automatically generated requests, or automated pulls, of information, so that personnel automatically receive certain information without requesting it. The term push is used herein to describe systems where information is automatically provided to personnel.

Capturing comprehensive manufacturing status information in real-time and timely communicating that information to management and shop personnel is highly desirable. Communicating timely information is especially difficult in large manufacturing facilities where management personnel are located at a distance from the manufacturing shop or in facilities where shop personnel work in a secure area separated from other personnel.

Problems with capturing and communicating information are exacerbated in a semiconductor manufacturing environment. Manufacturing of integrated circuits is perhaps the most complex manufacturing process in existence today. Factors contributing to this complexity include constant device miniaturization, process intricacy, product diversity, and changing technologies. Management of the semiconductor manufacturing process is accordingly complex and may involve thousands of steps performed on a silicon wafer to produce a fully packaged and integrated electronic component. An error in one process performed can render a particular lot of wafers unusable, so that timely detection and correction of problems in the manufacturing process can save significant resources.

Semiconductor manufacturing processes must occur in an environment free of contamination, so that semiconductor manufacturing facilities include a clean room in which the air is highly filtered to keep out impurities. Clean room personnel perform an elaborate procedure to clothe themselves in "bunny suits" which are required to keep them from contaminating the air. These elaborate procedures to enter the clean room environment are a barrier to direct and immediate communication between management and clean room personnel. Another barrier is the limited ability to use computers to communicate because devices inside the clean room must not contaminate the clean environment, and support of computers within the clean room environment is difficult.

Most communication between management and clean room personnel occurs during regular personnel meetings outside the clean room. However, regular meetings do not address the problems of communicating time-critical information about problems that arise between meetings. Managers can communicate information to clean room personnel during shift changes; however the time for shift changes must be very limited to avoid stalling production in the clean room. Once personnel have entered the clean room, communication with them may be accomplished in a number of ways. One method requires that the manager suit up and enter the clean room, where the ability to communicate is hindered and the communication is disruptive to clean room activities. Another method is that the information be announced over a loudspeaker, a poor way of communicating detailed technical information. Similarly, other known methods, such as using phones, pagers, and e-mail, are also limited. In addition, none of these methods provides immediate performance information to manufacturing shop personnel that can serve as a motivator.

In some semiconductor manufacturing facilities, specially-designed terminals reside in the clean room so that clean room personnel can request WIP information from the EDMS. However, typically the EDMS does not provide reports of time-critical information such as real-time tool status that are useful to clean room personnel. While real-time information may be available from the EDMS, access may be restricted to authorized personnel. Furthermore, the real-time information may available but require significant effort and resources to use it for managing the manufacturing environment.

Furthermore, most EDMS operate using a pull model so that time-critical information may not be brought to the attention of personnel if reports are not requested. Finally, the information presented on the terminal may not be not easily visible by clean room personnel while they are performing their work because the primary use for the terminal is to present other clean room status information.

A system is desirable that uses a push model, where data is automatically delivered to management and clean room personnel at prescribed intervals or based upon the occurrence of particular events. Furthermore, a system is desirable that automatically and continually updates presentations of data when events occur in the manufacturing shop. Providing time-critical information to personnel without the need for personnel initiating a report request would enable manufacturing shop personnel to operate the shop more efficiently and managers to address performance problems more quickly to effectively manage the manufacturing environment.

It is also known that a tool in an automated environment is controlled by a host computer system running a software intermediary, called an equipment interface. A tool and its host computer system are typically connected via a serial cable running from the tool to the host. The equipment interface controls the operation of the tool and the flow of information from the tool to its host computer system is critical to the entire manufacturing process. If one tool is unavailable, an entire production lot may be rendered unusable.

An equipment interface and a tool communicate with each other via a communication language/standard such as that known as SECS/GEM (SEMI Equipment Communications Standards/Generic Equipment Model). Tools have a common language, though the specifics of the communication may differ. The equipment interface typically receives SECS message streams from the tool regarding status and activities of the tool and sends SECS messages to instruct the tool to perform certain activities. The equipment interface typically records the tool/equipment interface communications in a communication log file, which is stored on the host computer system.

SECS-I is the general message transfer layer of the SECS standards. SECS-I defines the transfer of binary messages between a host computer system and one tool. Because this communication is from one point (the host computer system) to another (the tool), the connection is often called point-to-point. Communication under SECS-I is through a serial connection, such as an RS-232 link. In manufacturing management system 110, a tool interface 134 includes the hardware for the serial connection between a tool 132 and its host computer system.

A SECS-I driver is a library of software that allows the host or equipment to communicate using the SECS-I standard. Typically, the library includes modules for error handling, requesting retransmission of blocks, sorting blocks by message, pasting blocks together in the right order to create messages, and matching responses to messages. Through an elaborate and robust protocol, SECS-I makes message transfer reliable.

SECS-II is the layer that is mostly specific to the semiconductor industry and is designed to use SECS-I. SECS-II defines powerful data structures, a dictionary of data items that use those structures, and standard messages used in conversations with semiconductor equipment.

The term SECS message is used herein to describe both SECS-I and SECS-II messages.

Information that a tool can provide via a SECS message is limited. In general, the data contained in a SECS message includes events related to the tool's processing of material, such as a lot of wafers, and any errors encountered during the processing of the material. For example, a tool may be able to detect when it began processing material, when it completed that processing, and when errors or faults were detected. The tool itself may be unable to determine whether it was processing production, engineering, or qualification wafers.

A SECS message contains several pieces of information, including a general identifier that describes the type of message that follows (e.g., an alarm, a processing event, tool set-up, recipe download, etc.) and the data appropriate for the message type. SECS messages contain tool status information that the tool can provide, such as the tool state, tool events, tool set-up, and tool alarms. Some tools are configured to provide automatically additional information in these messages, such as recipe name, lot ID, and wafer number, which provides information about the context in which an event took place. This additional information is called a report. Other tools are not configured to provide reports automatically.

For example, a SECS message may contain a lot start event or a lot complete event. A report for these events may indicate the lot ID of the lot being processed, which enables the equipment interface to determine that the lot processed is a production lot. Productive time for the tool may then be calculated from the times of the lot start event and the lot complete event.

Message types are pre-defined by the SECS standard, but the events and reports (additional information attached to an event, such as material ID, recipe name, wafer number, etc.) vary by manufacturer and tool type. As mentioned earlier, some tools automatically provide pre-defined reports.

Manufacturing shops are configured to provide tool status information in real-time directly from a tool to its host computer system. The equipment interface uses the tool status information to control the tool, and therefore the connection between the equipment interface and the tool is critical. However, equipment interfaces typically do not provide real-time information to other application programs involved in managing the manufacturing process.

One method by which SECS messages communicated via a serial connection may gathered from a tool is to place an intermediary computer system between the tool and its host computer system. The single point-to-point connection between the tool and its host computer system is replaced with two point-to-point connections, one between tool and the intermediary computer system, and the other between the intermediary computer system and the host computer system. Each message communicated between the tool and the host computer system is received and copied by the intermediary computer system, and the message is passed along to its intended destination.

However, this method is very risky due to the critical nature of the equipment interface in controlling the tool. An intermediary computer system delays each message and introduces a potential failure point between the tool and its host computer system.

Another disadvantage of using an intermediary computer system is that two computer systems, the host computer system and the intermediary computer system, are required for each tool in the manufacturing shop. This solution is very expensive to implement in a manufacturing environment with a large number of tools. The expense of implementing such a system includes hardware costs, facility costs for housing the hardware, and management costs for managing the hardware and balancing the increased burdens on the facility.

Another method for obtaining tool status information directly from the tool is to use host-tool communication log files. Host-tool communication log files are created and updated by the equipment interface to include all communications between the tool and its host computer system. Using the host-tool communication log files enables application programs to obtain the information without the need for additional hardware or software to intercept the data. Advantages of this method include reducing the need for computers, obviating the need for additional cabling, providing a centralized single database, and allowing simplified system management (in a single proximal location).

However, the communication log file is also critical to the operation of a manufacturing tool. The equipment interface controls the operation of the tool in the manufacturing shop based upon the communications it receives and logs. To eliminate collisions and competition for accessing the communication log file, programs other than the equipment interface typically are prevented from accessing the communication log file until the file reaches a particular size, such as one megabyte. Then the equipment interface switches to another communication log file and the previous communication log file's data may be accessed. Depending on the number and size of messages communicated between a particular tool and its host computer system, the delay in accessing the communication log file may be unacceptably long.

It is desirable to obtain tool status information continually (in near real-time considering processing delays) and to provide the tool status information to other remote application programs so that tool performance problems may be quickly detected and corrected.

SUMMARY OF THE INVENTION

The present invention relates to an equipment interface which obtains data communicated between a tool, such as a semiconductor manufacturing tool, and its host computer system in real-time via a point-to-point connection. The equipment interface provides the data to other remote application programs in near real-time without the need for hardware to be added to the tool or to the host computer system.

In one aspect of the invention, a method for distributing data communicated via a point-to-point connection between a tool and a host computer system is disclosed. The method includes providing an equipment interface on the host computer system, obtaining the data to be distributed from the point-to-point connection with the equipment interface, and providing the data with the equipment interface to at least one data requester. A data requester includes a remote application program requesting the equipment interface to provide the data communicated via the point-to-point connection.

In another aspect of the invention, an equipment interface for distributing data communicated via a point-to-point connection between a tool and a host computer system is disclosed. The equipment interface resides on the host computer system. The equipment interface includes a connection handler for providing a connection between the equipment interface and a data requester and a message handler for distributing the data to the data requester via the connection provided by the connection handler.

In another aspect of the invention, a tools data handler for obtaining tool status information and for processing tool status information is disclosed. The tools data handler includes an equipment interface for obtaining the tool status information. The tools data handler optionally includes a parser for processing tool status information and a database server application for processing tool status information.

In another aspect of the invention, a computer system for obtaining tool status information is disclosed. The computer system is connected to a tool via a point-to-point connection and serves as a host to the tool. The computer system includes a processor and memory. The memory is configured with a module for obtaining the data to be distributed from the point-to-point connection and a module for providing the data to a data requester.

In another aspect of the invention, a signal embodied in a carrier wave is disclosed. The signal includes instructions for obtaining data to be distributed from a point-to-point connection between a tool and a host computer system for the tool and for providing the data to a data requester.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The present invention relates to an equipment interface which obtains information from a tool, such as a semiconductor manufacturing tool, in real-time. The equipment interface obtains data communicated via a point-to-point connection between the tool and its host computer system. The equipment interface provides the data to remote application programs continually upon request, without the need for hardware to be added to the tool or to the host computer system.

The term manufacturing process status information is used herein to describe information gathered from the manufacturing environment by the manufacturing management system. Manufacturing process status information includes tool status information collected from tools in a manufacturing shop of the manufacturing environment. Manufacturing process status information also includes work in progress status information about work in progress in the manufacturing shop. In addition, manufacturing process status information includes other information relevant to managing processes performed in the manufacturing shop, which is gathered from enterprise data management systems.

Figure 1:
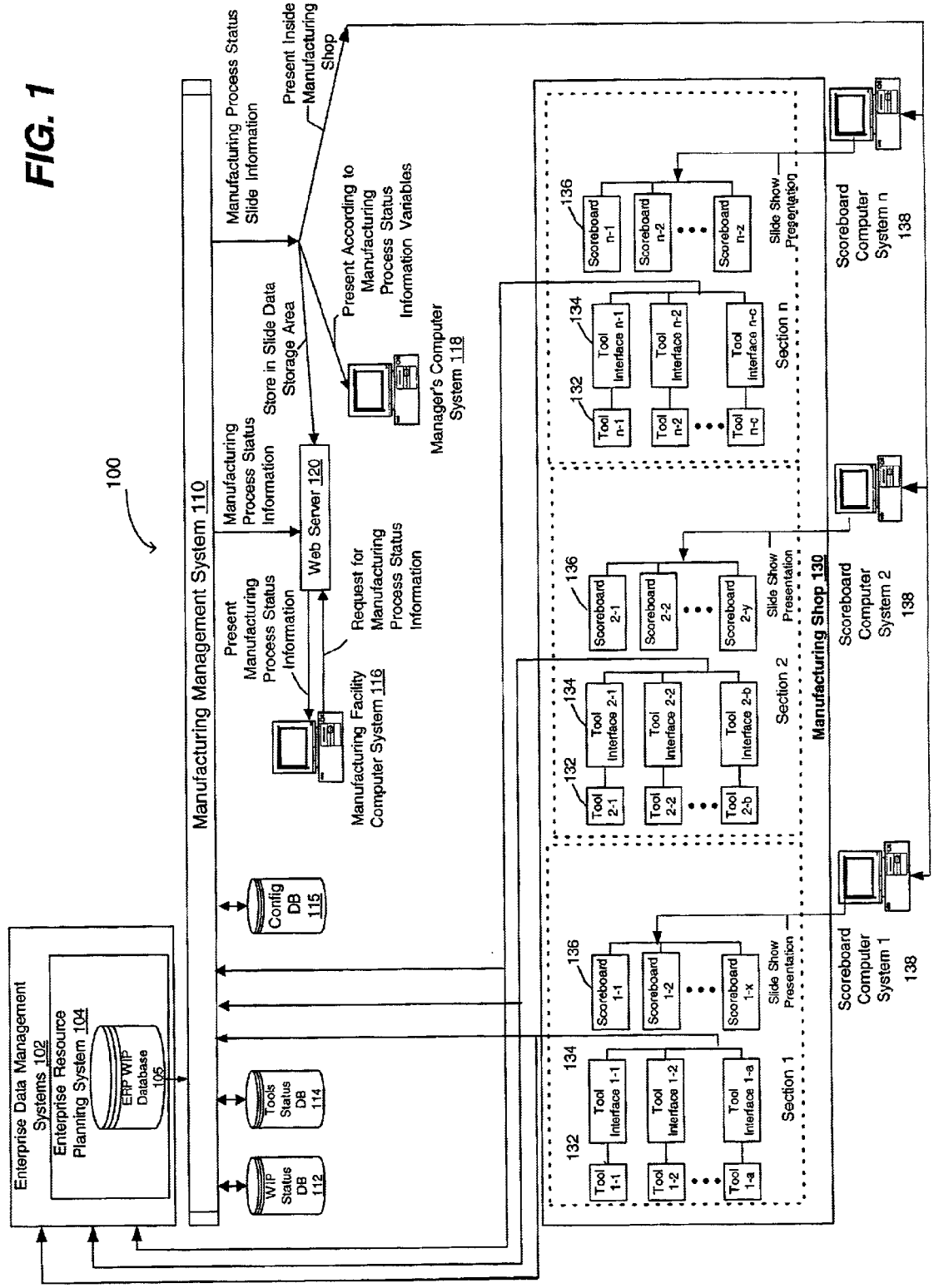
FIG. 1 shows a block diagram of a manufacturing environment which includes a manufacturing management system.

FIG. 1 shows a block diagram of a manufacturing environment 100, which includes a manufacturing management system 110. Manufacturing environment 100 includes a manufacturing shop 130, which includes at least one section. Each section of manufacturing shop 130 includes at least one tool 132. At least one tool 132 in manufacturing shop 130 is equipped with at least one tool interface 134. Tool interface 134 continually receives live tool status information from tool 132 in manufacturing shop 130. Manufacturing management system 110 is coupled to continually receive this live tool status information directly from tool interface 134.

Manufacturing management system 110 gathers other manufacturing process status information from sources in addition to tool interface 134. The term gathering is used herein to describe the gathering of manufacturing process status information, including receiving tools status information from tools, pulling work in progress status information from an enterprise work in progress data storage area, and pulling other manufacturing process status information from other enterprise data management systems. Gathering also includes storing the manufacturing process status information in a data storage area.

The term data storage area is used herein to describe retrieving information from and storing information in a data storage area. A data storage area includes a computer-readable medium to store the data. A computer-readable medium may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application-specific integrated circuits; volatile storage media including registers, buffers, caches, main memory, RAM, etc.; and data transmission media including computer network, point-to-point telecommunication, and carrier wave transmission media. Other new and various types of computer-readable media, including neural, biological, and crystal based media, may be used to store and/or transmit the manufacturing process status information discussed herein.

Computer programs use volatile data storage areas to store data as the computer program instructions are executed. The term data storage area is used herein to include data structures such as variables and arrays in these volatile data storage areas, also called computer program memory. The term data storage area also includes, but is not limited to, data storage areas organized as files, databases, tables of a database, database management systems, data mining systems, metadata, documents, and web pages.

A web page includes static data that is intended to be presented visually on a user's computer system monitor. A web page may also include embedded computer program instructions; for example, Active Server pages (ASP). The embedded computer program instructions may communicate with data storage areas such as database systems. Web servers are computer systems that provide World Wide Web services on the Internet and corporate intranets. Web servers accept requests from web browsers to download web pages and images. When a web server encounters an Active Server page that is requested by a web browser, it executes the embedded computer program instructions.

The terms pull and pulling are used herein to describe pulling manufacturing process status information from a manufacturing process status information data storage area. Pulling includes directly retrieving the manufacturing process status information from a data storage area. Pulling also includes requesting manufacturing process status information from another component and receiving the resulting manufacturing process status information.

The terms push and pushing include automatically delivering data into computer systems at prescribed intervals or based upon the occurrence of particular events. These particular events may include automatically generated requests, or automated pulls, of information, so that manufacturing environment personnel automatically receive certain information without requesting it. The term push is used herein to describe the automatic presentation of manufacturing process status information to manufacturing environment personnel.

Returning to FIG. 1, other sources of manufacturing process status information include enterprise data management systems 102, including enterprise resource planning system 104 work in progress database 105. Manufacturing management system 110 stores manufacturing process status information in at least one manufacturing process status information data storage area, such as work in progress (WIP) status database 112 and tools status database 114. Manufacturing management system 110 also stores information in a slide configuration data storage area, such as configuration database 115, which is used to configure presentations of slides describing manufacturing process status information.

The term slide as used herein includes a presentation of information in a graphical or textual form, including a presentation of a summary of the information such as a graph or a table. Slides used by one embodiment of manufacturing management system 110 include slides containing manufacturing process status information, slides summarizing manufacturing process status information, and slides prepared by manufacturing environment managers to communicate information to manufacturing shop 130 personnel. These slides prepared by manufacturing environment managers include announcements and instructions to manufacturing shop 130 personnel. A slide show consists of at least one slide.

Manufacturing management system 110 manipulates the data pulled from WIP status database 112 and tools status database 114 for presentation to manufacturing environment personnel. The term manipulating is used herein to describe the manipulating of manufacturing process status information, including summarizing manufacturing process status information; processing manufacturing process status information according to a pre-defined computer program; and pulling manufacturing process status information from a manufacturing process status information data storage area according to requested manufacturing process status information variables.

It will be understood by those in the art that a variable in a computer program may contain at least one corresponding value for the variable, including a null value if the computer program has defined but not yet assigned a value to the variable. The use of the term manufacturing process status information variable is used herein to include both the manufacturing process status information variable and the at least one corresponding value for the manufacturing process status information variable.

Examples of manufacturing process status information variables include a manufacturing process performed in a manufacturing shop; a tool in a manufacturing shop; a group of tools in a manufacturing shop; a type of tool in a manufacturing shop; work in progress in a manufacturing shop; a type of work in progress in a manufacturing shop; a product manufactured in a manufacturing shop; a type of product manufactured in a manufacturing shop; a status of at least one tool in a manufacturing shop; a throughput of tools in a manufacturing shop; a time interval; a shift in a manufacturing shop; an event in a manufacturing shop affecting management of the manufacturing shop; an event in a manufacturing shop affecting productivity of the manufacturing shop; and a manufacturing process status information data storage area from which manufacturing process status information is to be retrieved.

Each section of manufacturing shop 130 includes a corresponding at least one scoreboard computer system 138 that may reside inside or outside manufacturing shop 130. A scoreboard computer system 138 output for display is directed to a display device inside manufacturing shop 130 rather than to the scoreboard computer system 138 monitor. By providing manufacturing process status information inside the manufacturing shop, but allowing the scoreboard computer system 138 to reside outside the manufacturing shop, manufacturing management system 110 overcomes maintenance problems with computer systems inside a semiconductor manufacturing environment clean room and other sensitive manufacturing environments.

A scoreboard computer system 138 automatically and continually presents manufacturing process status information inside its corresponding section of manufacturing shop 130 on at least one display device such that the manufacturing process status information is easily visible to manufacturing shop 130 personnel. The term easily visible as used herein includes presenting manufacturing process status information on a display device large enough that the manufacturing process status information is legible from any location within manufacturing shop 130, such as a scoreboard 136. The term easily visible as used herein also includes presenting slides describing a tool 132 on a display device proximate to tool 132. The proximate presentation of manufacturing process status information about tool 132 allows manufacturing shop 130 personnel to view manufacturing process status information about the tool 132 with which they are working.

Manufacturing process status information is automatically and continually pushed to scoreboard computer system 138 and display devices, such as scoreboards 136, via a continual automated pull by manufacturing management system 110. The terms continual and continually are used herein to describe manufacturing management system 110 performing operations such as presenting a slide show. Continually performing an operation as used herein includes repeating the operation in intervals as close to real-time as possible, with brief intermissions only to allow for processing delays in performing the operation. The term update interval is used herein to describe these brief intermissions.

Manufacturing process status information is presented by at least one scoreboard computer system 138 in the form of a slide show. The preferred embodiment of manufacturing management system 110 presents slides in a slide show within manufacturing shop 130 cyclically, automatically and continually. For slide shows presented to managers, the preferred embodiment of manufacturing management system 110 presents at least two slides in a slide show simultaneously.

Manufacturing management system 110 uses slide configuration information to present slide shows on scoreboard computer systems 138. Slide configuration information is stored in a slide configuration data storage area, such as configuration database 115. Slide configuration information includes slide configuration variables such as a slide data storage area for a slide; a backup slide data storage area for a slide; a slide show in which a slide is to appear; an order in which each slide of the at least one slides of a slide show is to appear, wherein the order may be specified by authorized personnel; a default order in which each slide of the at least one slides of a slide show is to appear; an amount of time for which at least one slide of the at least one slides is to appear in a slide show, wherein the amount of time may be specified by authorized personnel; a default amount of time for which at least one slide of the at least one slides is to appear in a slide show; program instructions for producing the slide; and a data storage area for program instructions for producing the slide.

Manufacturing management system 110 automatically and continually updates manufacturing process status information in at least one manufacturing process status information data storage area, such as WIP status database 112 and tool status database 114. Manufacturing management system 110 automatically and continually pulls manufacturing process status information from the at least one manufacturing process status information data storage area during the presentation of a slide show. Manufacturing management system 110 also automatically and continually pulls slide configuration information from the at least one slide configuration data storage area during the presentation of a slide show. These two automatic and continual updates ensure that the manufacturing process status information is presented as closely as possible to real-time in the slide show.

Manufacturing process status information is also automatically and continually pushed, via a continual automated pull by manufacturing management system 110, to the manager's computer system 118 in the form of a manager's slide show. A manager's slide show presents at least two slides of manufacturing process status information simultaneously so that the manager may immediately view manufacturing process status information about activities for which the manager is responsible, rather than waiting for the slide show to cycle to a slide in which the manager is interested.

Slides in the manager's slide show may present manufacturing process status information according to manufacturing process status information variables, such as different activities or shifts in manufacturing shop 130. The term shift is used herein to indicate a group of manufacturing shop 130 personnel assigned to work in manufacturing shop 130 during assigned periods of time in turn with other groups. A shift is usually assigned to a manager responsible for manufacturing shop 130 activities performed during the shift. These slides presenting manufacturing process status information according to manufacturing process status information variables enable managers to also compare performance for different manufacturing process status information variable values, such as activities or shifts.

Manufacturing management system 110 automatically and continually updates manufacturing process status information, automatically and continually updates slide configuration information, and automatically and continually updates the presentation of a manager's slide show. Therefore, the data presented in each slide of a manager's slide show presentation changes automatically when the manufacturing process status information changes. In addition, if authorized personnel update a slide, the updated slide will be presented when the slide is next presented as part of a slide show.

Manufacturing process status information is also automatically continually pushed to web server 120 in the form of manufacturing process status slide information to be stored. Manufacturing process status information may also be pulled, or presented upon request, by manufacturing environment computer system 116 from web server 120. Preferably, manufacturing environment computer system 116 resides on a corporate intranet and web server 120 is protected by a firewall from outsider access. Web server 120 provides access to at least one service for requesting manufacturing process status information to be presented.

Work in progress (WIP) status database 112 includes scheduling and management information relevant to work in progress in manufacturing shop 130. WIP information from the enterprise resource planning WIP database 105 is automatically and continually gathered by manufacturing management system 110 and inserted into WIP status database 112. Tools information gathered by tools interfaces 134 may also be inserted by manufacturing management system 110 into WIP status database 112. For example, data about current tool 132 activity may be included in WIP status database 112.

Tools status database 114 includes tool status information automatically and continually gathered from tool 132 equipped with tool interface 134. Information from enterprise resource planning WIP database 105 may also be retrieved by manufacturing management system 110 and inserted into tools status database 114. For example, data about scheduled tool 132 activities may be included in tool status database 114.

Figure 2:
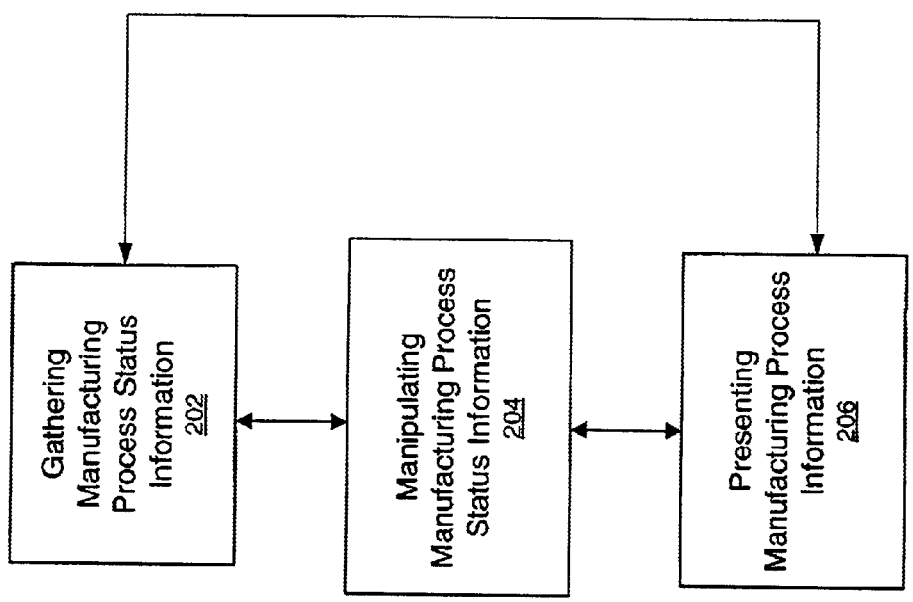
FIG. 2 shows a block diagram of three modules of the manufacturing management system of FIG. 1.

FIG. 2 shows three of the modules that may be included in manufacturing management system 110. Manufacturing management system 110 may include gathering module 202, which gathers manufacturing process status information including tool status information and work in progress status information; manipulating module 204 which manipulates the manufacturing process status information to prepare it for presentation; and presenting module 206 which presents the manufacturing process status information to manufacturing environment personnel. One embodiment of the system includes only a gathering module 202 and a presenting module 206; i.e., manipulating module 204 is not included in the embodiment. Other embodiments include all three modules.

Figure 3:
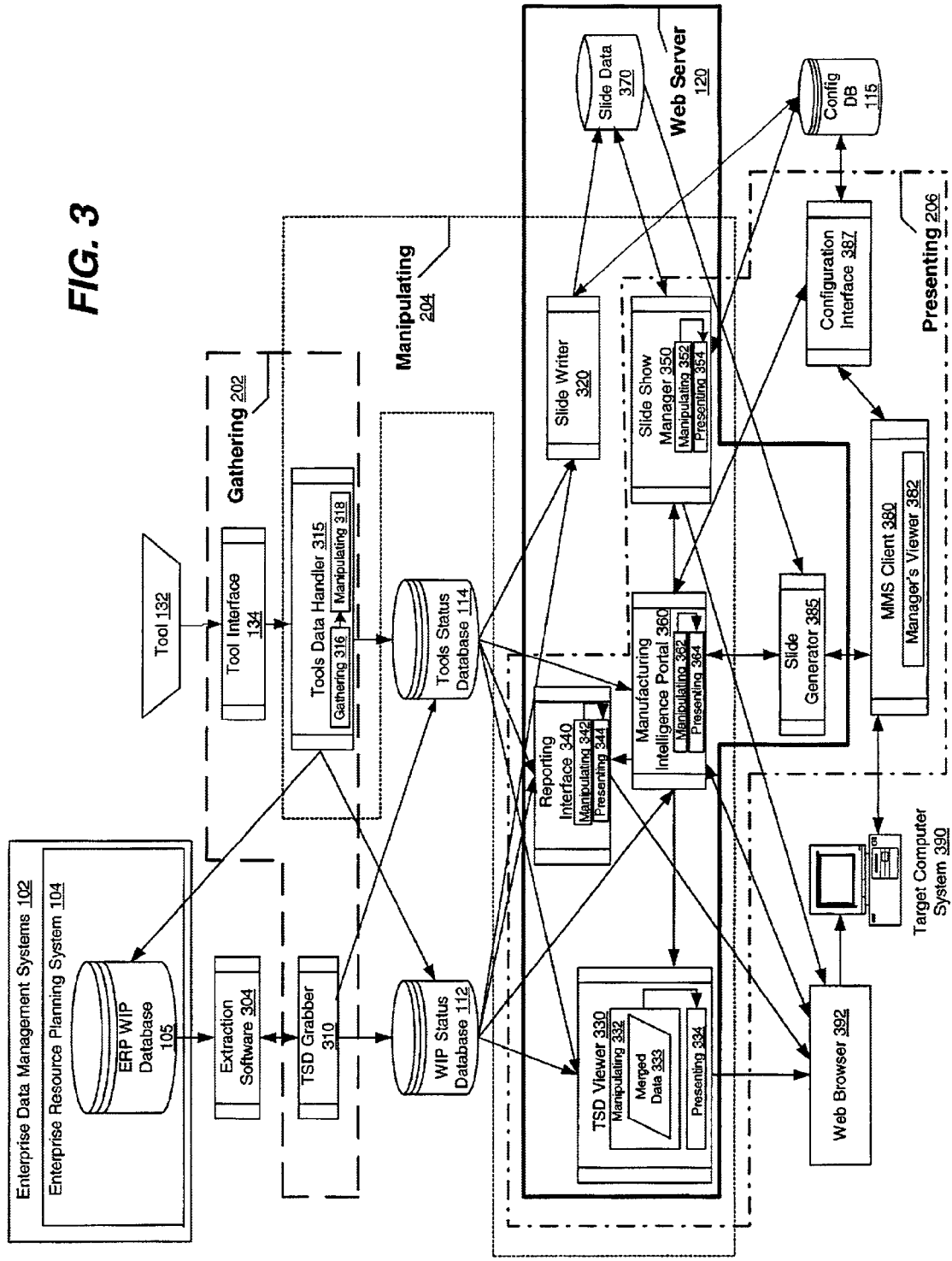
FIG. 3 shows components for each of the three modules of the manufacturing management system of FIG. 2.

FIG. 3 shows components for each of three modules of manufacturing management system 110. FIG. 3 also shows the interactions of each of the three modules with other components of manufacturing management system 110 and with other operational database and reporting systems within the manufacturing environment.

Gathering WIP Status Information and Tool Status Information from Enterprise Data Storage Areas FIG. 3 shows the interaction of manufacturing management system 110 components with the enterprise data management systems containing manufacturing process status information. The components gathering work in progress (WIP) information are discussed first, followed by a discussion of the components gathering tools information.

WIP Information. WIP information is captured by an enterprise resource planning system 104 of the enterprise data management systems 102 external to manufacturing management system 110 in at least one enterprise resource planning WIP database 105. WIP information is extracted from each of the at least one enterprise resource planning WIP database 105 by extraction software 304.

A data grabber, such as Time Series Data (TSD) grabber 310, pulls WIP data from enterprise work in progress data storage areas and provides the WIP data to manufacturing management system 110. In the embodiment shown in FIG. 3, TSD grabber 310 requests extraction software 304 to pull WIP data from enterprise resource planning WIP database 105. TSD grabber 310 provides at least one manufacturing process status information variable to extraction software 304 to use in pulling WIP data. For example, TSD grabber 310 may request that extraction software 304 pull only manufacturing process status information recorded during a particular time interval. Extraction software 304 then provides WIP data to Time Series Data (TSD) grabber 310.

TSD grabber 310 is coupled to provide WIP data to WIP status database 112 and tools status database 114 for access by other manufacturing management system 110 components, such as slide writer 320, TSD viewer 330, reporting interface 340, and manufacturing intelligence portal 360.

Some tools status information also is gathered by manufacturing management system 110 and inserted into WIP status database 112. The components performing this activity will be described in more detail in the following discussion of tools information.

Tools Information. As described above, tool interface 134 continually receives live tool status information from tool 132 in manufacturing shop 130. The term receiving live tools status information is used herein to include receiving tool status information continually as a live stream, where the information is received immediately as the event occurs, and receiving information in an interrupted stream, where the information is organized into packets of information before it is transmitted. A component of manufacturing management system 110, such as tools data handler 315, is coupled to receive live tool status information directly from tool interface 134. Tool interface 134 includes commercially available and custom-developed tool interfaces. In the embodiment shown in FIG. 3, a commercially available tool interface 134 provides a hardware interface from at least one manufacturing shop 130 tool 132 to a manufacturing management system 110 component, such as tools data handler 315. Tools data handler 315 then manipulates the raw tool data and stores tool status information in tool status database 114 and in WIP status database 112. Tools data handler 315 also stores some tool status information in ERP WIP database 105.

The embodiment shown in FIG. 3 of tools data handler 315 includes equipment interfaces, TP2 Parsers and Database Server application. Equipment interfaces are software intermediaries that control a tool and connect the tool to an enterprise resource planning WIP management system, such as the Enterprise Resource Planning System 104 and its corresponding ERP WIP database 105. Equipment interfaces provide tool status information to other components of the manufacturing management system 110 as well as to other enterprise systems.

SEMATECH's software is proprietary and available only to consortium members. SEMATECH's TP2 Parsers parse the live tool status information gathered by tool interface 134. SEMATECH's Database Server application performs calculations on the parsed tool status information before tool status information is inserted into a database. In the embodiment shown in FIG. 3, tools data handler 315 also includes several customized parsers developed for manufacturing management system 110 from SEMATECH's proprietary parsers.

Tools status database 114 is accessed by manufacturing management system 110 components such as a data viewer, including Time Series Data (TSD) Viewer 330; a reporting interface, such as reporting interface 340; a slide writer, such as slide writer 320; and a manufacturing intelligence portal, such as manufacturing intelligence portal 360.

As discussed above, real-time and other information from the enterprise resource planning WIP database 105 may also be pulled by manufacturing management system 110 component TSD grabber 310 and inserted into WIP status database 112 and tools status database 114. This tool status information may include tool status information gathered by Tools Data Handler 315 of manufacturing management system 110. For example, data about the scheduled activities of tools may be included in tools status database 114.

Components of gathering module 202 may also be components of manipulating module 204 or presenting module 206. In the embodiment shown in FIG. 3, tools data handler 315 is shown as a component of both gathering module 202 and manipulating module 204. Tools data handler 315 includes gathering program instructions 316 to receive the raw tools data and manipulating program instructions 318 to prepare the tool status information for insertion into work in progress status database 112 and tool status database 114.

Manipulating WIP Status Information and Tools Status Information for Presentation Manufacturing process status information, including WIP status information and tools status information, gathered by gathering module 202 is manipulated by manipulating module 204 for presentation. As discussed above, manipulating module 204 is an optional component of manufacturing management system 110.

Manipulating module 204 may include a plurality of components. These components include a tools data handler, such as the tools data handler 315 described above; a slide writer, such as slide writer 320; a data viewer, such as Time Series Data Viewer 330; a reporting interface, such as reporting interface 340; a manufacturing intelligence portal, such as manufacturing intelligence portal 360; and a slide show manager, such as slide show manager 350.

Specifically, tools data handler 315 manipulates tool status information received by tool interface 134 before inserting the tool status information into tools status database 114 and WIP status database 112. Slide writer 320 produces and stores on web server 120 slide data 370, which summarizes and describes manufacturing process status information. Time Series Data (TSD) viewer 330 manipulates data from WIP status database 112 and tools status database 114 to build merged data 333. Merged data 333 presents an accurate composite or merged picture of manufacturing process status information. Reporting interface 340 provides manipulating components in the form of pre-programmed report program instructions, query program instructions, and modeling report program instructions. These reporting interface report programs manipulate manufacturing process status information from WIP status database 112, tools status database 114, and enterprise data management systems 102. Slide show manager 350 allows managers to access, manipulate and update data from configuration database 115 to configure and manage slide shows. Slide show manager 350 also allows managers to provide slides to be presented to manufacturing environment personnel, such as announcements and instructions to manufacturing shop 130 personnel.

Components of manipulating module 204 may also be components of gathering module 202 or presenting module 206. As discussed above, tools data handler 315 is shown as a component of both gathering module 202 and manipulating module 204. In addition, TSD viewer 330, reporting interface 340, slide show manager 350, and manufacturing intelligence portal 360 are each shown as components of both manipulating module 204 and presenting module 206. TSD viewer includes manipulating program instructions 332 to produce merged data 333 and presenting program instructions 334. Reporting interface includes manipulating program instructions 342, such as program instructions to provide reports of manufacturing process status information, and presenting program instructions 344. Slide show manager 350 includes manipulating program instructions 352 to allow appropriate manufacturing environment personnel to modify slide configuration information in configuration database 115, and presenting program instructions 354. Manufacturing intelligence portal 360 includes manipulating program instructions 362 to produce slide shows and graphs and presenting program instructions 364.

Presenting WIP and Tools Information to Manufacturing Environment Personnel

Manufacturing management system 110 presenting module 206 provides presentations of manufacturing process status information. Several forms of presentations are provided by presenting module 206, including but not limited to presentations of individual slides, slide shows, graphs, reports, queries, modeling reports to assess model input variables, and time series data. Slides are presented by manufacturing management system client 380 (including manager's viewer 382) and manufacturing intelligence portal 360; graphs are presented by manufacturing intelligence portal 360; pre-programmed reports, query results, and modeling reports to assess model input variables are presented by reporting interface 340; and time series data are presented by TSD viewer 330.

In addition, manufacturing management system 110 presenting module 206 provides downloads of manufacturing process status information via reporting interface 340, which is accessible via manufacturing intelligence portal 360. Reporting interface 340 presents manufacturing process status information in a form manipulatable, such as a spreadsheet, by manufacturing environment personnel requesting manufacturing process status information.

Presentations of slides will be discussed first, followed by a discussion of other presentations of manufacturing process status information. In the embodiment shown in FIG. 3, each slide is produced in the form of a web page and presented by a web browser. Other embodiments include producing the slides in other forms, such as bitmaps, and presenting the forms using appropriate software for the slide. Alternative forms of access to slides of manufacturing process status information are available via a manufacturing management system client, such as the manufacturing management system client 380 installed on target computer system 390, and a manufacturing intelligence portal, such as manufacturing intelligence portal 360, which is accessed via a web browser 192 installed on target computer system 390. Each of these alternative forms of access to slides will be described below.

Manufacturing management system client 380 is installed on target computer systems 390 to present slides. Manufacturing management system client 380 provides the functionality of a browser with enhanced error-handling capabilities for slide show presentations. Target computer system 390 is representative of any of the different computer systems with access to manufacturing process status information shown in FIG. 1, including but not limited to manufacturing environment computer system 116, manager's computer system 118, and scoreboard computer systems 138.

Manufacturing management system client 380 may be installed on scoreboard computer systems 138 and manager's computer systems 118, but normally would not be installed on manufacturing environment computer system 116. Manufacturing environment personnel using manufacturing environment computer systems 116 without manufacturing management system client 380 installed normally access manufacturing intelligence portal 360 using browser 192 to obtain manufacturing process status information.

Because manufacturing management system 110 automatically and continually updates manufacturing process status information, the data presented by manufacturing management system client 380 in a slide show changes automatically to include the updated manufacturing process status information when each of the at least one slides is presented.

Manufacturing management system client 380 invokes presentation module 206 components slide generator 385 and configuration interface 387 to present an individual slide, including each of the at least one slides presented as part of a slide show. Manufacturing management system client 380 invokes configuration interface 387 to determine the slide data 370 data storage area for the slide to be presented. Configuration interface 387 returns slide configuration information, including the corresponding slide data 370 data storage area, to manufacturing management system client 380. Manufacturing management system client 380 then uses the slide configuration information to invoke slide generator 385 to access the corresponding slide data 370 data storage area and generate the slide in the form of a web page. Manufacturing management system client 380 then presents the slide.

Manufacturing management system client 380 invokes configuration interface 387 to present a slide show. Configuration interface 387 accesses configuration database 115 to pull slide configuration information. Slide configuration variables include the order in which the slides comprising the slide show are to be presented and the amount of time for which each slide is to be presented. Configuration interface 387 returns slide configuration information to manufacturing management system client 380. Manufacturing management system client 380 invokes slide generator 385 to generate each slide. Manufacturing management system client 380 then presents each of the at least one slides in the slide show according to the slide configuration information.

Manufacturing management system client 380 includes manager's viewer 382, which provides a specially-formatted slide show of manufacturing process status information for managers. Manufacturing management system 110 automatically and continually updates manufacturing process status information and automatically and continually updates the presentation of a manager's slide show. Therefore, the data presented in each slide of a manager's slide show presentation changes automatically when the manufacturing process status information changes.

Presenting module 206 also includes a manufacturing intelligence portal 360. A manufacturing intelligence portal is a business intelligence portal, which is a form of a corporate portal, which is a form of a web portal. A web portal is a web "supersite" that provides a variety of services including web searching, e-mail, news, and links to other web sites. A corporate portal is an internal web site on an intranet that provides proprietary, enterprise-wide information to company employees as well as access to other internal web sites and selected public web sites. A business intelligence portal is a corporate portal that enables users to query and execute pre-programmed reports on enterprise-wide databases. Manufacturing intelligence portal 360 provides primarily manufacturing process status information rather than business information.

The manufacturing intelligence portal 360 of manufacturing management system 110 resides on web server 120. A user of a target computer system 390 accesses manufacturing intelligence portal 360 using a web browser 192 installed on target computer system 390. Manufacturing intelligence portal 360 presents slides of manufacturing process status information. Manufacturing intelligence portal 360 invokes slide generator 385 to generate individual slides, including each of the at least one slides to be presented in a slide show.

For presentations of manufacturing process status information other than slide shows, manufacturing intelligence portal 360 provides target computer system 390 with services for manipulating and presenting manufacturing process status information. Each service may allow a manufacturing environment personnel requester to select manufacturing process status information variables to be used in retrieving manufacturing process status information for performing the service. In the embodiment shown in FIG. 3, manufacturing intelligence portal 360 provides services for graphing manufacturing process status information and presenting slides. Also in the embodiment shown in FIG. 3, manufacturing intelligence portal 360 provides other services including a data viewer such as TSD viewer 330 and a reporting interface such as reporting interface 340.

TSD viewer 330 includes manipulating program instructions 332 to provide a composite picture of tools and WIP data in merged data 333. Merged data 333 is presented by TSD viewer 330 upon request via manufacturing intelligence portal 360. TSD viewer 330 also includes presenting program instructions 334, such as a zooming function to allow the manufacturing environment personnel requester to view selected time series data in more detail.

Reporting interface 340 includes manipulating program instructions 342, which provides manufacturing process status information from WIP status database 112 and tools status database 114 according to manufacturing process status information variables selected by a manufacturing environment personnel requester. Reporting interface 340 also includes presenting program instructions 344 and provides the manufacturing process status information requested in a form manipulatable by the manufacturing environment personnel requester, such as a spreadsheet.

Slide show manager 350 provides read and write access to configuration database 115 to modify the slide configuration information used to present slides and slide shows. Slides and slide shows on the user's target computer system 390 monitor by web browser 192, and on the manufacturing shop 130 display devices such as scoreboards 136 by manufacturing management system client 380, and in manager's slide shows presented by manager's viewer.

Components of manipulating module 204 may also be components of presenting module 206. In the embodiment shown in FIG. 3, TSD viewer 330, reporting interface 340, slide show manager 350, and manufacturing intelligence portal 360 are each shown as components of both manipulating module 204 and presenting module 206. Each of these components performs both manipulating functions and presenting functions.

TSD viewer includes manipulating program instructions 332 to produce merged data 333 and presenting program instructions 334, including a zooming function to allow the manufacturing environment personnel requester to view selected time series data in more detail. Reporting interface includes manipulating program instructions 342 and presenting program instructions 344 to provide manufacturing process status information in a form manipulatable by the manufacturing environment personnel requester, such as a spreadsheet. Slide show manager 350 includes manipulating program instructions 352 and presenting program instructions 354 to allow authorized manufacturing environment personnel to view and change slide configuration information in configuration database 115. Manufacturing intelligence portal 360 includes manipulating program instructions 362 to produce slide shows and presenting program instructions 364 to present the slide shows.

Figure 4:
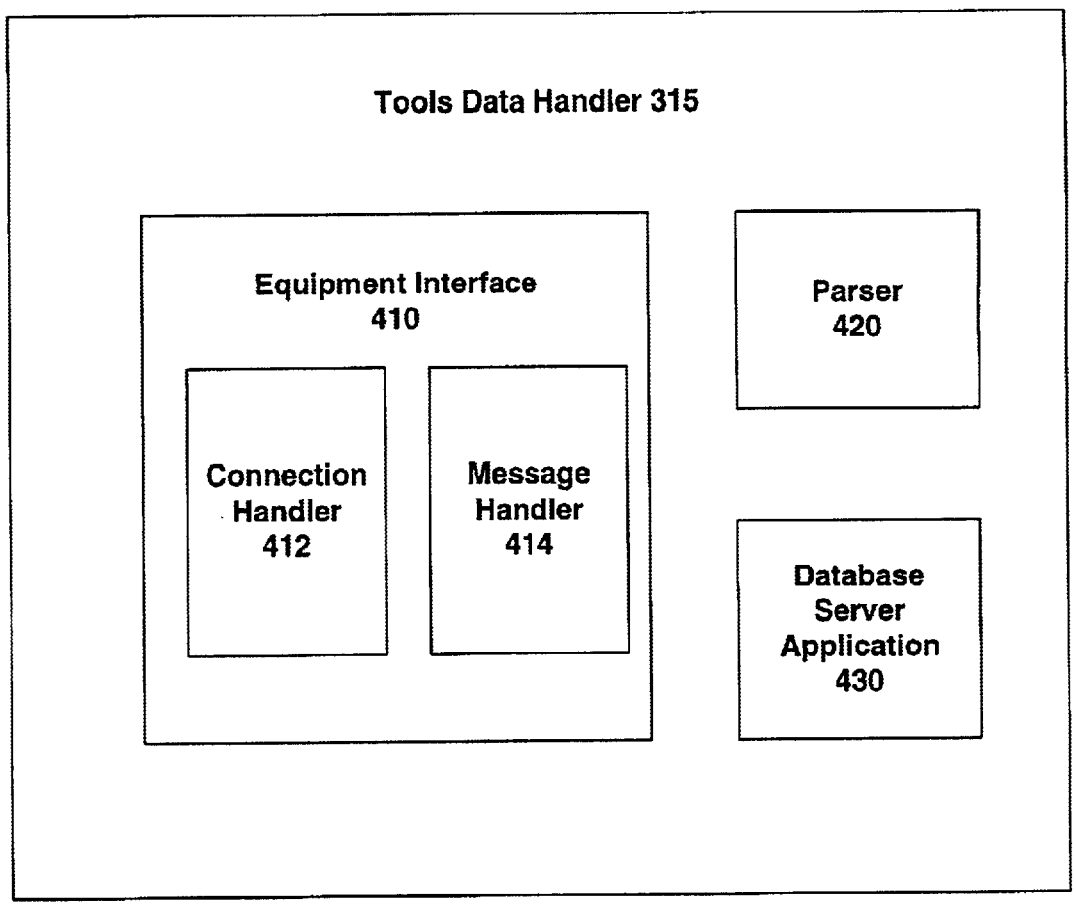
FIG. 4 shows a block diagram of the tools data handler of FIG. 3.

FIG. 4 shows a block diagram of tools data handler 315. Equipment interface 410, parsers 420 and database server application 430 are shown as components of tools data handler. As described earlier, equipment interface 410, parsers 420 and database server application 430 work together to manipulate the raw tool data and store tool status information in tool status database 114, WIP status database 112 and ERP WIP database 105.

The equipment interface 410 component of tools data handler 315 is coupled to obtain live data directly from a tool 132 via its tool interface 134. The live data includes a stream of data communicated via a point-to-point connection between the tool 132 and its host computer system. Equipment interface 410 automatically and continually obtains the live data, in the form of SECS messages over the point-to-point connection, and uses the data to control the operation of the tool.

Equipment interface 410 also automatically and continually provides the live stream of data to remote application programs that request the data. Equipment interface 410 provides the data without the need for hardware to be added to the tool 132 or to the equipment interface 410 host computer system.

Equipment interface 410 includes connection handler 412 and message handler 414, in addition to the modules normally used for controlling the tool 132. Connection handler 412 connects one or more remote application programs to the host computer system upon request. Via the connection, the remote application program continually receives the same stream of data communicated between the tool 132 and its host computer system. Message handler 414 queues data in the form of SECS messages for distribution to requesting application programs via the connection established by connection handler 412. Message handler 414 then sends the message to remote application programs connected to the host computer system. The functions performed by connection handler 412 and message handler 414 are in addition to the tool control functionality provided by prior art equipment interfaces.

A SECS message must be processed to identify the relevant events and information contained in the SECS message. A tool type-specific program (such as a parser 420) for each tool 132 searches the message stream received from the tool 132 for relevant SECS messages and events. The parser may send the tool status information to another program, such as a database server application 430, that places the data into a database. The database server application 430 analyzes the information in the context of messages previously received and performs the necessary calculations to determine the values to insert into the database. For example, the time from a wafer start to complete is calculated and stored as processing time, while the time from a wafer complete to the next wafer start is calculated and stored as idle time. The information in the database can be retrieved and displayed using commercial software, a direct SQL query, or other specialized applications (such as presentation module 206 of manufacturing management system 110).

Figure 5:
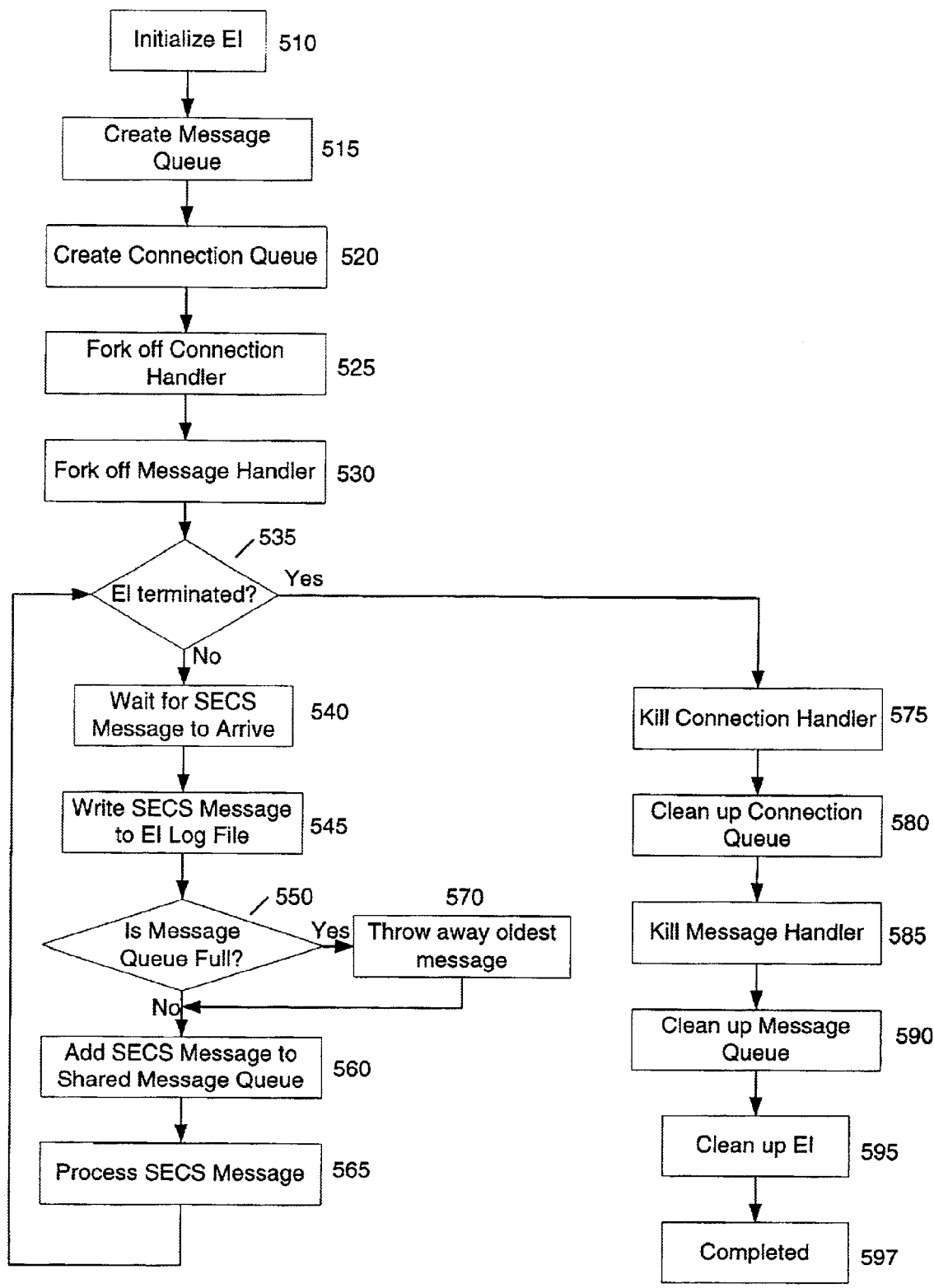
FIG. 5 shows a flowchart of the operation of the equipment interface of FIG. 4.

FIG. 5 shows a flowchart of the operation of an equipment interface 410. In the embodiment shown in FIG. 5, equipment interface 410 uses TCP/IP sockets to enable application programs to request tool status information. A socket is an endpoint for communication. Two cooperating sockets, one on a local computer system and one on a remote computer system, form a connection. In equipment interface 410, the host computer system and the computer system hosting the remote application program may each act as either a local or a remote computer system.

The combination of the IP address of a computer system and an IP port number make up a socket. The port number represents a logical assignment of a number to a port, and not a physical plug or socket.

The data that is written on one socket of a connection can immediately be read by the other socket of the connection as if the data are stored locally. Once a SECS message is written to the message queue, an application program with a connection to the host computer system has access to the message queue. The transfer of data between the two sockets is handled transparently by the underlying TCP/IP.

A well-known port for a particular protocol is a port number, typically from 0 to 1023, that is widely used for a certain type of data on the network. For example, World Wide Web traffic is typically assigned IP port 80, and HTTP packets are sent to IP port 80.

In step 510, the equipment interface 410 initializes by reading configuration files and performing tasks such as reserving memory needed for processing. These configuration files include the definitions of reports that a tool is to provide to the equipment interface. In step 515, equipment interface 410 creates a message queue for storing messages from a tool 132. The terms message and SECS message are used herein to refer to the live stream of data communicated between the tool 132 and its host computer system. In step 520, equipment interface 410 creates a connection queue for storing sockets for connections between remote application programs and the host computer system.

In step 525, equipment interface 410 forks off a separate process for running the connection handler 412. In step 530, equipment interface 410 forks off another separate process for running the message handler 414. In step 535, if the equipment interface 410 is manually terminated, the equipment interface 410 proceeds to step 575 to shut down. In step 535, if the equipment interface 410 computer system is not terminated, the equipment interface 410 proceeds to step 540.

In step 540, equipment interface 410 waits for a message to arrive from tool 132. When a SECS message arrives, in step 545, equipment interface 410 writes the SECS message to an equipment interface 410 communication log file.

In step 555, equipment interface 410 determines whether the message queue is full. If the message queue is full, equipment interface 410 proceeds to step 570 to throw away the oldest message and continues to step 560. If the message queue is not full, equipment interface 410 proceeds from step 555 directly to step 560. In step 560, equipment interface 410 adds the SECS message to the message queue. In step 565, equipment interface 410 processes the SECS message to extract information relevant to control of the tool 132. After processing the SECS message in step 565, equipment interface 410 returns to step 535.

In step 535, when the equipment interface 410 computer system is terminated, equipment interface 410 proceeds to step 575. In step 575, equipment interface 410 kills the connection handler and, in step 580, cleans up the connection queue, releasing the memory reserved for the connection queue. In step 585, equipment interface 410 kills the message handler and, in step 590, cleans up the message queue, releasing the memory reserved for the message queue. Clean up activity, such as releasing memory reserved for other data, is performed in step 595 and the equipment interface 410 completes execution in step 597.

Figure 6:
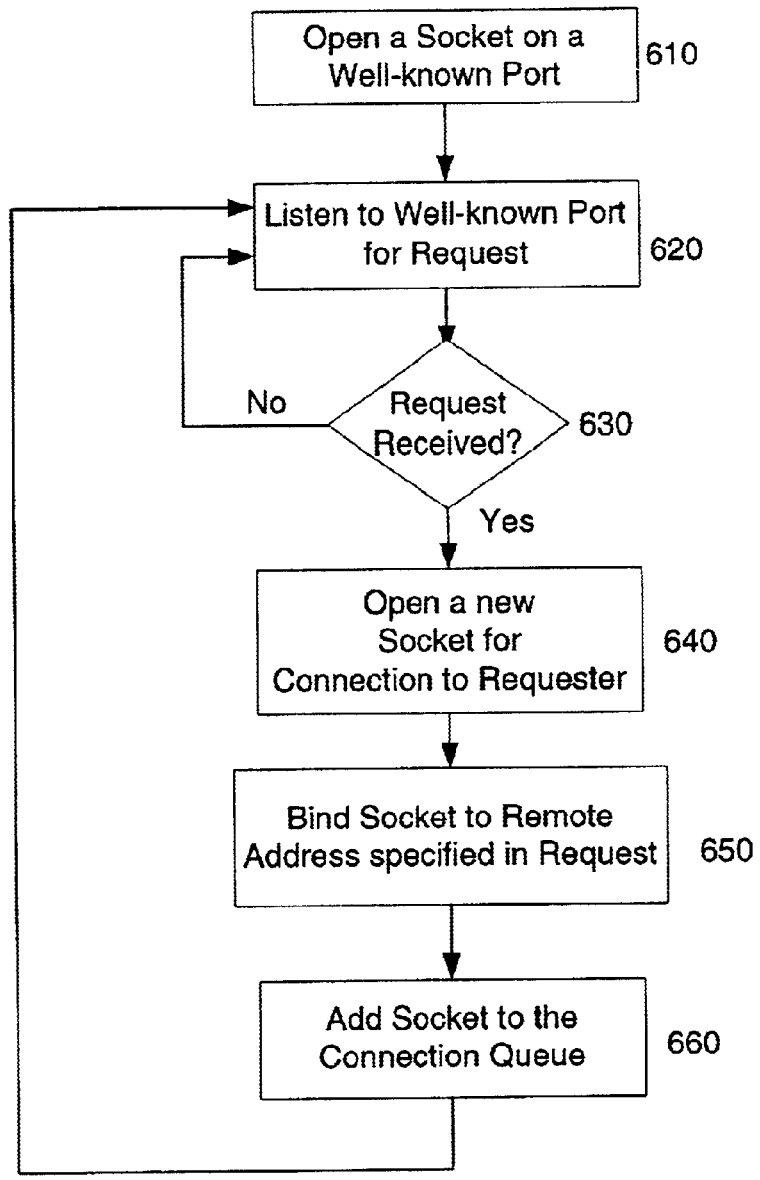
FIG. 6 shows a flowchart of the operation of the connection handler of FIG. 4.

FIG. 6 is a flowchart of the operation of connection handler 412. Connection handler 412 is run by a separate process forked off by equipment interface 410. One connection handler 412 process will be forked off for each tool 132/equipment interface 410. In step 610, connection handler 412 opens a socket on a well-known port. The well-known port is open to receive requests from remote application programs, data requesters, for the live stream of data including tool status information. The terms remote application program and data requester are used interchangeably herein. In step 620, connection handler 412 listens to the well-known port for a request. In step 630, connection handler 412 determines whether a request has been received on the well-known port. If a request has not been received, connection handler 412 returns to step 620 to continue listening. If a request has been received, connection handler 412 proceeds to step 640.

In step 640, connection handler 412 opens and binds a socket so that the requesting application program has its own socket level connection to the equipment interface 410. In step 650, connection handler 412 adds a socket specified in the request as a remote address to the connection queue. From step 650, connection handler 412 returns to step 620 to continue listening.

Figure 7:
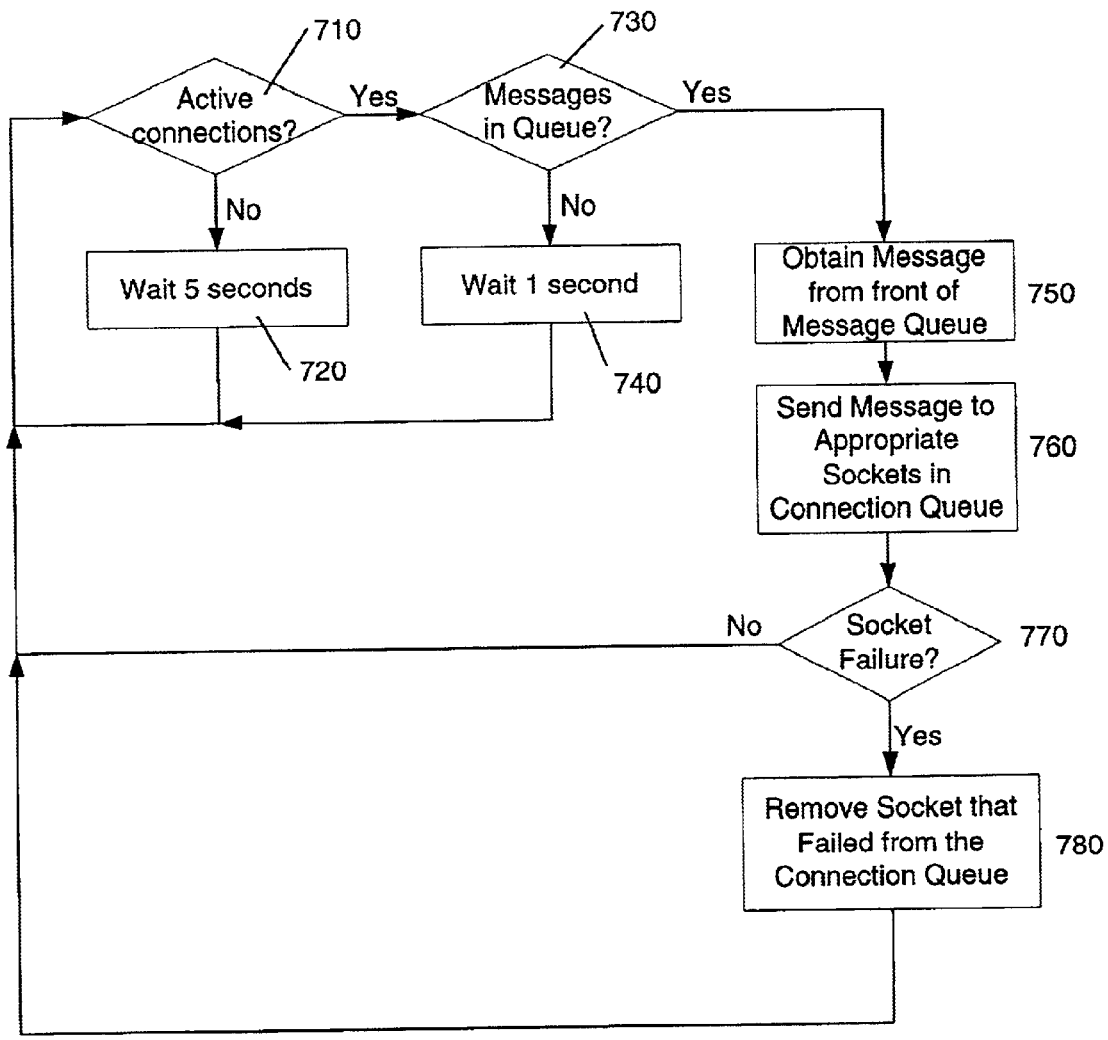
FIG. 7 shows a flowchart of the operation of the message handler of FIG. 4. The use of the same reference symbols in different drawings indicates similar or identical items

FIG. 7 shows a flowchart of the operation of message handler 414. Message handler 412 is run by a separate process forked off by equipment interface 410. One message handler 414 process will be forked off for each tool 132/equipment interface 410. In step 710, message handler 414 checks for active connections to equipment interface 410. If no active connections exist, message handler 414 proceeds to step 720 to wait five seconds and then returns to step 710 to check for active connections again. If in step 710 active connections exist, message handler 414 proceeds to step 730 to determine whether the message queue contains messages. If the message queue contains no messages, message handler 414 waits one second in step 740 and returns to step 710 to check for active connections again.

In step 730, if the message queue contains messages, message handler 414 proceeds to step 750. In step 750, a message is obtained from the front of the message queue. In step 760, message handler 414 sends the message to appropriate sockets in the connection queue. In one embodiment, the entire SECS message received from tool 132 is sent to each socket. However, in other embodiments, the message handler 414 may analyze the SECS message's content and send only certain types of messages to particular sockets.

In step 770, message handler 414 checks whether a socket has failed. If a socket has failed, in step 780 message handler 414 removes the socket that failed from the connection queue and returns to step 710 to check for active connections again. If no socket has failed, message handler 414 returns to step 710 to check for active connections again.

Other Embodiments

Other embodiments are within the following claims.

For example, the equipment interface described herein was developed in conjunction with and to provide tool status information to a manufacturing management system. However, one of skill in the art will recognize that the equipment interface may be used to provide equipment information to many different types of application programs and is not limited to use with a manufacturing management system.

What is claimed is:

1. A method for distributing data communicated via a point-to-point connection between a tool and a host computer system comprising:

providing an equipment interface on the host computer system;

obtaining the data to be distributed from the point-to-point connection with the equipment interface; and providing the data with the equipment interface to at least one data requester.

2. The method of claim 1, further comprising:

extracting tool status information from the data; and providing the tool status information to the at least one data requester.

3. The method of claim 1, wherein
the at least one data requester resides at an address remote from the host computer system.

4. The method of claim 1, wherein
the at least one data requester is an application program.

5. The method of claim 1, wherein
the data communicated via the point-to-point connection is communicated using the SECS-I standard.

6. The method of claim 1, wherein
the data communicated via the point-to-point connection is communicated using the SECS-II standard.

7. The method of claim 1, wherein the data communicated via the point-to-point connection comprises:
a live stream of the data sent by the tool to the host computer system.

8. The method of claim 1, wherein the data communicated via the point-to-point connection comprises:
a live stream of data sent by the host computer system to the tool.

9. The method of claim 1, wherein
the obtaining the data to be distributed from the point-to-point connection includes logging data communicated between the too and the host computer system in a communication log file.

10. The method of claim 9, wherein
the communication log file is stored on the host computer system.

11. The method of claim 1, wherein the providing the data comprises:
providing a first socket on a well-known port; and
listening to the well-known port for a request for the data from a data requester.

12. The method of claim 11, wherein the request includes a remote address.

13. The method of claim 11, wherein the request includes a remote address and the providing the data further comprises:
opening a second socket to be connected to the remote address; and
binding the second socket to the remote address.

14. The method of claim 13, wherein the providing the data further includes adding the remote address to a connection queue, the remote address being a socket.

15. The method of claim 1, wherein
the providing the data includes continually providing the data.

16. The method of claim 1, wherein
the providing the data includes automatically providing the data.

17. The method of claim 1, wherein
the tool is a manufacturing tool.

18. The method of claim 1, wherein
the tool is a semiconductor fabrication tool.

19. An equipment interface for distributing data communicated via a point-to-point connection between a tool and a host computer system, the equipment interface residing on the host computer system, wherein the equipment interface comprises:
a connection handler for providing a connection between the equipment interface and a data requester; and
a message handler for distributing the data to the data requester via the connection provided by the connection handler.

20. The equipment interface of claim 19, wherein the equipment interface further includes at least one of a group consisting of the following:
a module for receiving data from the tool, the data being a message;
a module for sending data to the tool, the data being a message;
a module for logging data communicated between the tool and the host computer system in a communication log file, the data being a message;
a module for creating a message queue; and
a module for adding data communicated to a message queue, the data being a message.

21. The equipment interface of claim 19, wherein
the data requester includes an application program.

22. The equipment interface of claim 19, wherein
the data requester provides a request for the data, the request including a remote address, the remote address being a socket.

23. The equipment interface of claim 19, wherein
the connection handler includes a module for providing a first socket on a well-known port for receiving requests for the data.

24. The equipment interface of claim 23, wherein
the connection handler includes a module for opening a second socket for a connection from the equipment interface to a data requester.

25. The equipment interface of claim 24, wherein
the data requester provides a request for the data, the request including a remote address, the remote address being a third socket; and
the connection handler includes a module for binding the second socket to the third socket.

26. The equipment interface of claim 25, wherein
the connection handler includes a module for adding the third socket to a connection queue.

27. The equipment interface of claim 19, wherein
the message handler includes a module for detecting active connections.

28. The equipment interface of claim 19, wherein
the message handler includes a module for determining whether data exists in a message queue, the data being a message.

29. The equipment interface of claim 19, wherein
the message handler includes a module for obtaining data from the front of a message queue, the data being a message.

30. The equipment interface of claim 19, wherein
the message handler includes a module for sending data to a socket in a connection queue, the data being a message.

31. The equipment interface of claim 19, wherein
the message handler includes a module for determining a socket to which the data is sent, the data being a message.

32. The equipment interface of claim 19, wherein
the message handler includes a module for determining if a socket has failed.

33. The equipment interface of claim 19, wherein
the message handler includes a module for removing a socket that failed from a connection queue.

34. The equipment interface module of claim 19, wherein
the equipment interface includes a module for providing a first socket on a well-known port for receiving requests for the data.

35. The equipment interface of claim 34, wherein
the equipment interface includes a module for opening a second socket for a connection from the equipment interface to a data requester.

36. The equipment interface of claim 35, wherein
the data requester provides a request for the data, the request including a remote address, the remote address being a third socket; and
the equipment interface includes a module for binding the second socket to the third socket.

37. The equipment interface of claim 36, wherein
the equipment interface includes a module for adding the third socket to a connection queue.

38. The equipment interface of claim 19, wherein
the equipment interface includes a module for detecting active connections.

39. The equipment interface of claim 19, wherein
the equipment interface includes a module for determining whether data exists in a message queue, the data being a message.

40. The equipment interface of claim 19, wherein
the equipment interface includes a module for obtaining data from the front of a message queue, the data being a message.

41. The equipment interface of claim 19, wherein
the equipment interface includes a module for sending data to a socket in a connection queue, the data being a message.

42. The equipment interface of claim 19, wherein
the equipment interface includes a module for determining a socket to which the data is sent, the data being a message.

43. The equipment interface of claim 19, wherein
the equipment interface includes a module for determining if a socket has failed.

44. The equipment interface of claim 19, wherein
the equipment interface includes a module for removing a socket that failed from a connection queue.

45. A tools data handler for obtaining tool status information and for processing tool status information, wherein
the tools data handler includes an equipment interface for obtaining the tool status information.

46. The tools data handler of claim 45, further including:
a parser for processing the tool status information.

47. The tools data handler of claim 45, further including:
a database server application for processing the tool status information.

48. A computer system for obtaining tool status information, the computer system including a processor and a memory, the computer system being connected to a tool via a point-to-point connection, the computer system serving as a host to the tool, the memory configured with the following:
a module for obtaining the data to be distributed from the point-to-point connection; and
a module for providing the data to a data requestor.

49. A signal embodied in a carrier wave, comprising instructions for the following:
obtaining data to be distributed from a point-to-point connection between a tool and a host computer system for the tool; and
providing the data to a data requester.

* * * * *